US008412440B2

(12) United States Patent
Kaneko et al.

(10) Patent No.: US 8,412,440 B2
(45) Date of Patent: Apr. 2, 2013

(54) PRESSURE SENSOR FAILURE DIAGNOSIS METHOD AND COMMON RAIL TYPE FUEL INJECTION CONTROL APPARATUS

(75) Inventors: Hirotaka Kaneko, Saitama (JP); Sakae Suda, Saitama (JO); Kenichi Iino, Saitama (JP)

(73) Assignee: Bosch Corporation, Tokyo (JP)

( * ) Notice: Subject to any disclaimer, the term of this patent is extended or adjusted under 35 U.S.C. 154(b) by 376 days.

(21) Appl. No.: 12/933,614

(22) PCT Filed: Mar. 16, 2009

(86) PCT No.: PCT/JP2009/054994

§ 371 (c)(1), (2), (4) Date: Sep. 20, 2010

(87) PCT Pub. No.: WO2009/116475

PCT Pub. Date: Sep. 24, 2009

(65) Prior Publication Data

US 2011/0022290 A1 Jan. 27, 2011

(30) Foreign Application Priority Data

Mar. 19, 2008 (JP) ................................ 2008-071955

(51) Int. Cl.
*F02D 41/00* (2006.01)
*G01M 15/00* (2006.01)

(52) U.S. Cl. .................... 701/103; 73/114.43; 123/458; 123/456

(58) Field of Classification Search ............... 73/114.43; 701/103, 114; 123/456, 458, 472, 479, 480, 123/486, 514

See application file for complete search history.

(56) References Cited

U.S. PATENT DOCUMENTS

| | | | | |
|---|---|---|---|---|
| 6,012,438 A | | 1/2000 | Joos et al. | |
| 6,032,639 A | * | 3/2000 | Goto et al. | 123/295 |
| 7,025,050 B2 | * | 4/2006 | Oono et al. | 123/690 |

(Continued)

FOREIGN PATENT DOCUMENTS

| | | |
|---|---|---|
| JP | 10325352 A | 12/1998 |
| JP | 2002327634 A | 11/2002 |

(Continued)

*Primary Examiner* — Thomas Moulis
*Assistant Examiner* — Elizabeth Hadley
(74) *Attorney, Agent, or Firm* — Michael Best & Friedrich LLP

(57) ABSTRACT

It is possible to perform a failure diagnosis of a pressure sensor with a simple structure without installing a dedicated circuit for the failure diagnosis. In a common rail type fuel injection control apparatus, a pressure control valve 12 is provided in a fuel return path from a common rail 1, and a rail pressure detected by a pressure sensor 11 can be controlled to match a target rail pressure through drive control of the pressure control valve 12 by an electronic control unit 4. The target rail pressure is calculated based on operational information of an engine 3. In the common rail type fuel injection control apparatus, learning processing is performed, in which a correction coefficient Cv is stored and updated as a learning value to correct energization characteristics of a median product of the pressure control valves 12 that are stored in the electronic control unit 4. At the same time, it is determined whether the learning value of the correction coefficient Cv is within a predetermined range. When it is determined that it is not within the predetermined range, the pressure sensor 11 is diagnosed as having a failure.

7 Claims, 6 Drawing Sheets

U.S. PATENT DOCUMENTS

| | | | | |
|---|---|---|---|---|
| 7,900,605 | B2 * | 3/2011 | Dingle | 123/480 |
| 2003/0116150 | A1 | 6/2003 | Kobayashi et al. | |
| 2008/0236548 | A1 * | 10/2008 | Iihoshi et al. | 123/475 |
| 2009/0150046 | A1 * | 6/2009 | Achleitner et al. | 701/103 |

FOREIGN PATENT DOCUMENTS

| | | | |
|---|---|---|---|
| JP | 2005315110 | A | 11/2005 |
| JP | 2007138774 | A | 6/2007 |

* cited by examiner

FIG. 6

(a)

| | | | | | |
|---|---|---|---|---|---|
| PRESSURE (MPa) | 0 | 50 | 100 | 150 | 200 |
| OUTPUT VOLTAGE (V) | 0.3 | 1.3 | 2.3 | 3.3 | 4.3 |

(b)

| | | | | | |
|---|---|---|---|---|---|
| CORRECTION CODE | a | b | c | ··· | z |
| DEVIATION AMOUNT | 0.1 | −0.1 | −0.1 | −0.05 | −0.1 |

(c)

| | | | | | |
|---|---|---|---|---|---|
| PRESSURE (MPa) | 0 | 50 | 100 | 150 | 200 |
| OUTPUT VOLTAGE (V) | 0.2 | 1.4 | 2.4 | 3.35 | 4.4 |

PRESSURE SENSOR FAILURE DIAGNOSIS METHOD AND COMMON RAIL TYPE FUEL INJECTION CONTROL APPARATUS

BACKGROUND OF THE INVENTION

1. Field of the Invention

The present invention relates to sensor failure detection, and it particularly relates to sensor failure detection with improved swiftness, easiness etc.

2. Description of the Related Art

For example, various sensors are provided in an electronic control device of an automobile internal combustion engine, such as a diesel engine, and detection signals of the various sensors are used for operational control of the internal combustion engine.

One example of such a sensor is a pressure sensor that detects rail pressure in a common rail type fuel injection control apparatus. The pressure sensor is important to achieve appropriate fuel injection, and various types of methods have been proposed to detect a failure.

As one of failure diagnosis methods of the pressure sensor in the common rail type fuel injection control apparatus, for example, a method has been proposed in which, when a failure of the pressure sensor is diagnosed, a command to intentionally increase the rail pressure is performed, while a command to decrease an energization time of an injector is given. In this method, it is assumed that there is no failure with the pressure sensor when it is determined that there has been no change in a fuel injection amount and exhaust gas properties as a result of the commands as disclosed, for example, in JP-A-10-325352.

However, in the above-described failure diagnosis method, in order to detect the failure of the pressure sensor, it is necessary to issue the command to increase the rail pressure unnecessarily, irrespective of an actual fuel injection. This not only creates redundancy in a control operation, but also there is a risk that an unnecessary increase of the rail pressure may actually occur for some reason, which has an impact on a fuel injection operation.

SUMMARY OF THE INVENTION

The present invention has been made in view of the above-described circumstances, and provides a pressure sensor failure diagnosis method and a common rail type fuel injection control apparatus that make it possible to conduct a failure diagnosis with a simple structure without installing a dedicated circuit for the failure diagnosis.

According to a first aspect of the invention, there is provided a pressure sensor failure diagnosis method in a common rail type fuel injection control apparatus, wherein a pressure control valve is provided on a fuel return path from a common rail, and a rail pressure detected by a pressure sensor can be controlled to match a target rail pressure that is calculated based on operational information of an engine, through drive control of the pressure control valve, wherein the pressure control valve is driven by energization at a current value that is obtained by correcting, using a predetermined correction coefficient, a current value that is determined in accordance with the target rail pressure, based on predetermined drive characteristics of the pressure control valve that are stored in advance, and wherein the predetermined correction coefficient is calculated for the target rail pressure, using a predetermined arithmetic expression, based on the current value determined in accordance with the predetermined drive characteristics of the pressure control valve and a current value by which the pressure control valve is energized to cause a rail pressure detected by the pressure sensor to match the target rail pressure or to fall within a predetermined acceptable range, while the correction coefficient is stored and updated through learning processing every time the correction coefficient is calculated, along with the rail pressure at the time of the calculation, the pressure sensor failure diagnosis method being characterized by diagnosing that the pressure sensor has a failure when a learning value of the correction coefficient in the learning processing deviates from a predetermined range.

According to a second aspect of the invention, there is a common rail type fuel injection control apparatus that comprises a high pressure pump device that pressure feeds fuel to a common rail, a pressure control valve that is provided on a return path of fuel from the common rail, a pressure sensor that detects pressure of the common rail, and an electronic control unit that controls drive of the high pressure pump device and the pressure control valve, wherein the electronic control unit calculates a target rail pressure based on operational information of an engine, and in order to match a rail pressure detected by the pressure sensor with the target rail pressure, the electronic control unit drives the pressure control valve by energization at a current value that is obtained by correcting, using a predetermined correction coefficient, a current value that is determined in accordance with the target rail pressure, based on predetermined drive characteristics of the pressure control valve that are stored in advance, and wherein the predetermined correction coefficient is calculated for the target rail pressure, using a predetermined arithmetic expression, based on the current value determined in accordance with the predetermined drive characteristics of the pressure control valve and a current value by which the pressure control valve is energized to cause a rail pressure detected by the pressure sensor to match the target rail pressure or to fall within a predetermined acceptable range, while the correction coefficient is stored and updated through learning processing every time the correction coefficient is calculated, along with the rail pressure at the time of the calculation, the common rail type fuel injection control apparatus being characterized in that the electronic control unit determines whether a learning value of the correction coefficient in the learning processing is within a predetermined range, and diagnoses the pressure sensor as having a failure when it is determined that the learning value is out of the predetermined range.

BRIEF DESCRIPTION OF THE DRAWINGS

FIG. 6 is an explanatory diagram that illustrates an initial performance correction of the pressure sensor, where FIG. 6(*a*) shows an explanatory diagram showing an example of the output characteristics of the median product of the pressure sensors, FIG. 6(*b*) shows an explanatory diagram that illustrates correspondence relationships between correction codes and a deviation amount, FIG. 6(*c*) shows an explanatory diagram that illustrates an example of the output characteristics of the pressure sensor, the output characteristics being stored in the electronic control unit after the initial performance correction has been performed.

DETAILED DESCRIPTION OF THE PREFERRED EMBODIMENTS

An embodiment of the invention will be described below with reference to FIG. 1 to FIG. 6.

It will be noted that the members and arrangements described below are not intended to limit the present invention and can be variously modified within the scope of the gist of the present invention.

First, an example of the structure of an internal combustion engine injection control apparatus, to which a failure diagnosis method of a pressure sensor according to the embodiment of the invention is applied, is described with reference to FIG. 1.

Figure 1:
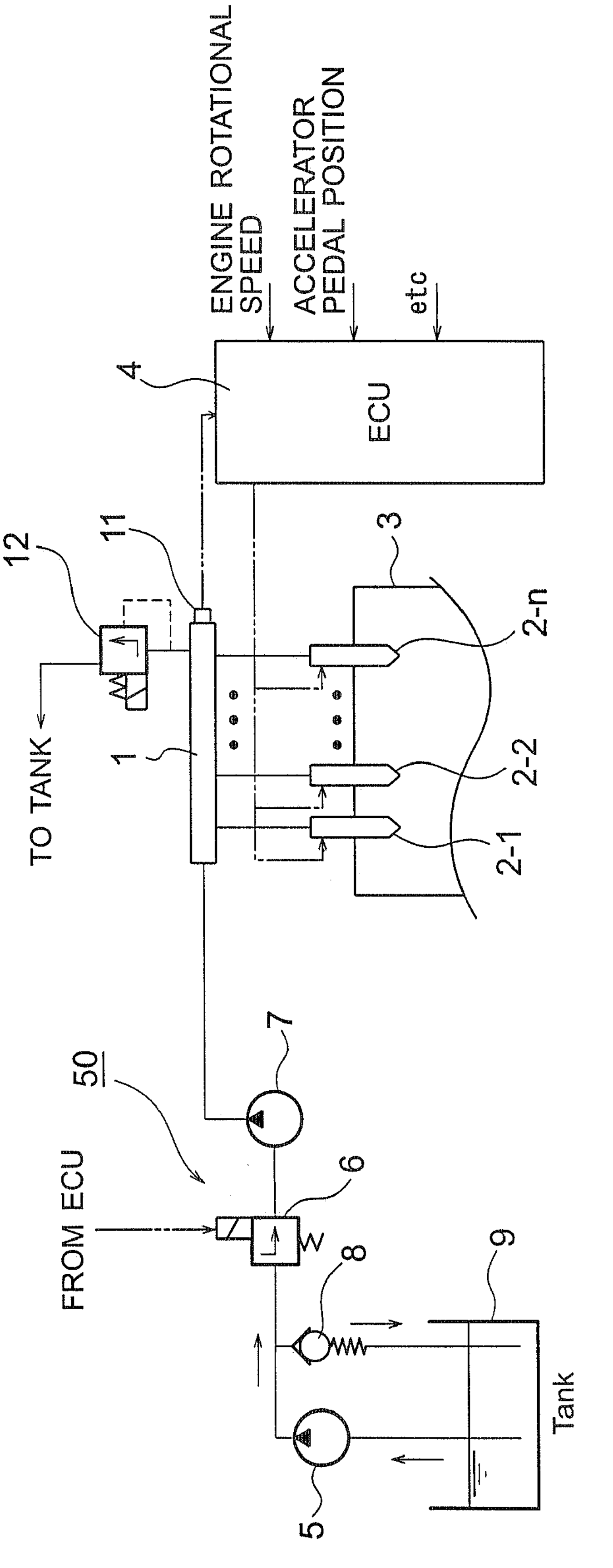
FIG. 1 is a structural diagram showing an example of a structure of a common rail type fuel injection control apparatus to which a pressure sensor failure diagnosis method according to an embodiment of the invention is applied.

More specifically, the internal combustion engine injection control apparatus shown in FIG. 1 includes, in particular, a common rail type fuel injection control apparatus.

The main structural elements of the common rail type fuel injection control apparatus are a high pressure pump device 50 that pressure feeds high pressure fuel, a common rail 1 that accumulates the high pressure fuel pressure fed by the high pressure pump device 50, a plurality of fuel injection valves 2-1 to 2-*n* that inject and supply the high pressure fuel supplied from the common rail 1 to cylinders of a diesel engine (hereinafter referred to as an "engine") 3, and an electronic control unit (shown as "ECU" in FIG. 1) 4 that performs fuel injection control processing and pressure sensor failure diagnosis processing etc., described below.

The structure itself is substantially the same as a basic structure of this type of a well-known fuel injection control apparatus.

The high pressure pump device 50 has a known structure whose main structural elements are a supply pump 5, a flow rate control valve 6, and a high pressure pump 7.

In the structure, fuel inside a fuel tank 9 is pumped up by the supply pump 5 and supplied to the high pressure pump 7 via the flow rate control valve 6. In this example, an electromagnetic proportional control valve is used for the flow rate control valve 6, and by controlling its energization amount using the electronic control unit 4, a flow rate of fuel supplied to the high pressure pump 7, in other words, a discharge rate of the high pressure pump 7, is adjusted.

Note that a return valve 8 is provided between an outflow side of the supply pump 5 and the fuel tank 9, and excess fuel on the outflow side of the supply pump 5 can be returned to the fuel tank 9.

Further, the supply pump 5 may be provided on the upstream side of the high pressure pump device 50 separately from the high pressure pump device 50, or the supply pump 5 may be provided inside the fuel tank 9.

The fuel injection valves 24 to 2-*n* are provided respectively for each cylinder of the diesel engine 3. The high pressure fuel is supplied to each of the fuel injection valves 24 to 2-*n* from the common rail 1, and fuel injection is performed while being injection controlled by the electronic control unit 4.

In the common rail 1 of the invention, a pressure control valve 12 is provided on a return path (not shown in the figures) that returns excess high pressure fuel to the tank 9, and the pressure control valve 12 is used to control a rail pressure with the flow rate control valve 6.

In the embodiment of the invention, an appropriate rail pressure control is realized through changing respective operational states of the flow rate control valve 6 and the pressure control valve 12 in accordance with an operational state of the engine 3. The rail pressure control according to the embodiment of the invention, which is performed by the flow rate control valve 6 and the pressure control valve 12, is generally described as below. First, as a first rail pressure control state, there is a rail pressure control state in which a desired rail pressure is obtained by adjusting a fuel discharge amount from the flow rate control valve 6, while fully closing the pressure control valve 12, namely, closing a flow path from the common rail 1 to the return path.

Next, as a second rail pressure control state, there is a rail pressure control state in which the desired rail pressure is obtained by adjusting a valve opening degree of the pressure control valve 12, while fully closing the flow rate control valve 6.

Then, as a third rail pressure control state, there is a rail pressure control state in which the desired rail pressure is obtained by applying a predetermined valve opening degree to the flow rate control valve 6 and the pressure control valve 12, respectively.

In accordance with the operational state of the engine 3, one of these control states is selected and then performed.

The electronic control unit 4 includes, for example, a micro computer (not shown in the figures) as a central element, which has a known structure, and a memory element (not shown in the figures) such as a RAM, a ROM etc. The electronic control unit 4 also has, as its main structural elements, a drive circuit (not shown in the figures) that drives the fuel injection valves 2-1 to 2-*n* and an energization circuit (not shown in the figures) that energizes the flow rate control valve 6 and the pressure control valve 12.

A detection signal from a pressure sensor 11 that detects pressure of the common rail 1 is input into the electronic control unit 4. In addition, various detection signals related to an engine rotational speed, an accelerator pedal position etc. are input into the electronic control unit 4 to be used for operational control and fuel injection control of the engine 3.

Figure 2:
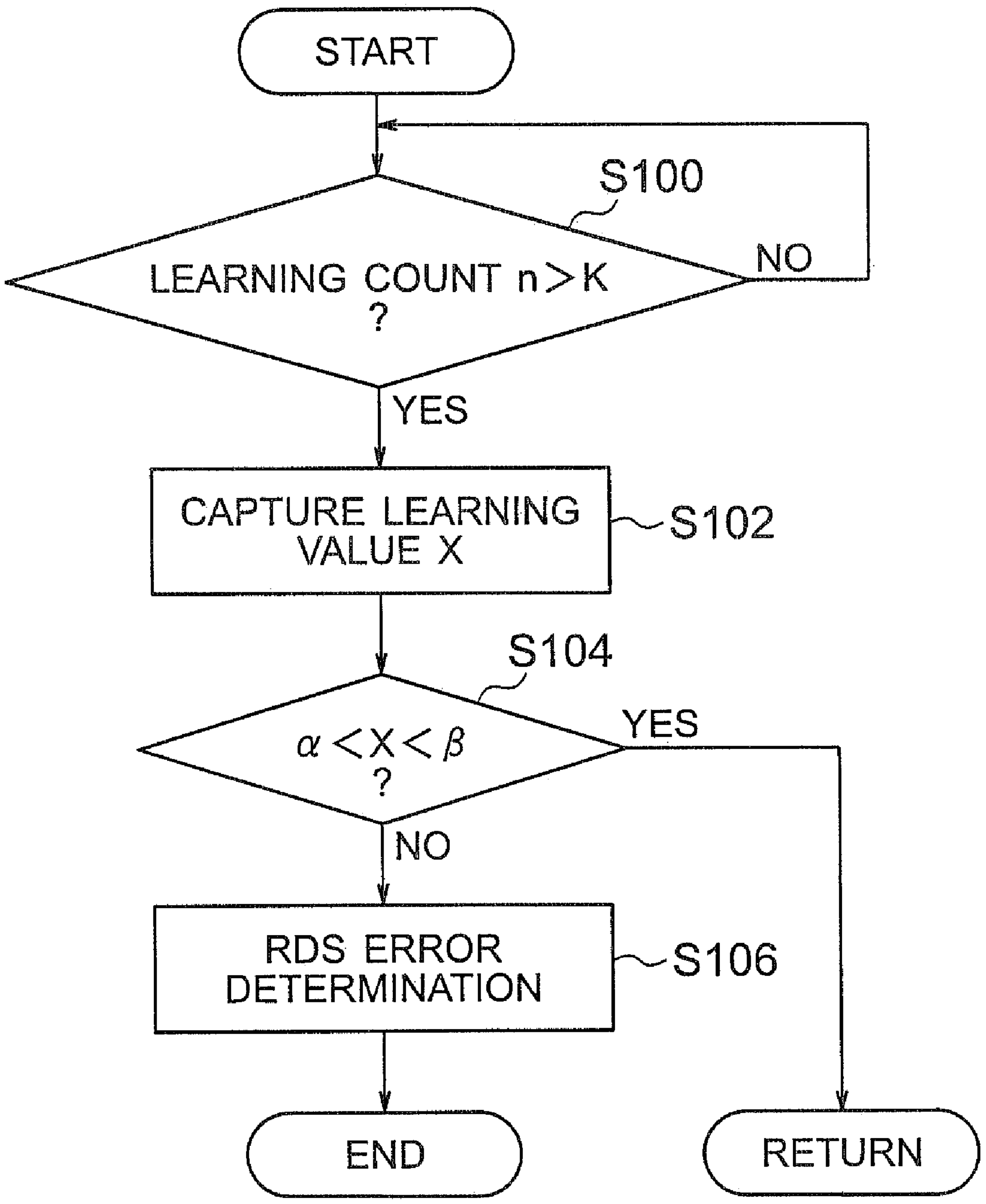
FIG. 2 is a subroutine flow chart showing a procedure of pressure sensor failure diagnosis processing that is performed by an electronic control unit that constitutes the common rail type fuel injection control apparatus shown in FIG. 1.

FIG. 2 shows a subroutine flow chart illustrating a procedure of pressure sensor failure diagnosis processing that is performed by the electronic control unit 4. The pressure sensor failure diagnosis processing according to the embodiment of the invention will be described below with reference to FIG. 2.

First, the pressure sensor failure diagnosis processing is generally described as below. First, the pressure sensor failure diagnosis processing presupposes that learning processing related to the pressure control valve 12 is performed as one fuel injection control process in the common rail type fuel injection control apparatus. As described below in detail, the pressure sensor failure diagnosis processing uses a learning value obtained from the learning processing to determine whether or not the pressure sensor 11 has a failure.

Here, the learning processing relating to the pressure control valve 12 is the processing in which a target rail pressure is set, and when the pressure control valve 12 is energized, both a correction coefficient, which is used for calculating an energization current, and an actual rail pressure at that point in time are stored in a predetermined memory area of the electronic control unit 4, while the stored values are updated every time when new values are obtained. Note that a detailed explanation of the learning processing is omitted here since the learning processing itself is a known art, and the learning processing according to the embodiment of the invention has substantially the same basic processing procedure as the known learning processing.

As described below, this kind of learning processing is performed to correct a deviation between predetermined energization characteristics of the pressure control valve that are stored in advance in the electronic control unit 4 and actual energization characteristics of the pressure control valve 12.

Figure 3:
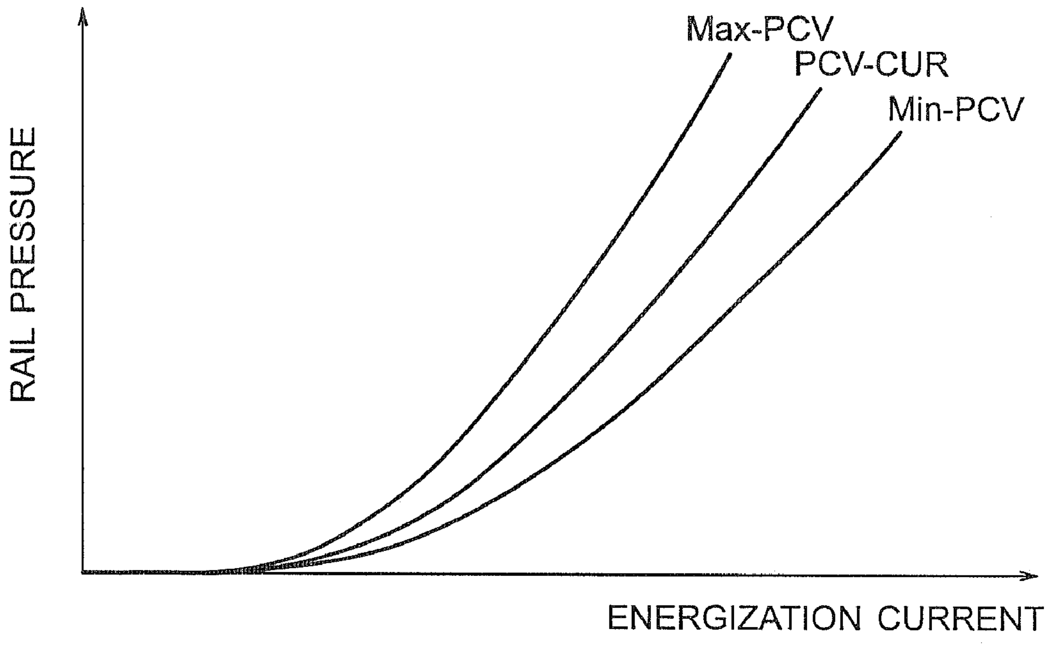
FIG. 3 is a characteristic line diagram showing an example of energization characteristics of a pressure control valve that is used for the common rail type fuel injection control apparatus shown in FIG. 1.

First, since the pressure control valve 12 is an electromagnetic type, in other words, since it has an electromagnetic coil (not shown in the figures), it is difficult to avoid creating some level of variation in its electrical characteristics, as shown in an example in FIG. 3.

Note that in FIG. 3, the horizontal axis represents an energization current value of the pressure control valve 12, and the vertical axis represents the rail pressure, respectively. In addition, in the same figure, a characteristic line that is indicated as "Min-PCV" shows a characteristic example in which the rail pressure goes down to its lowest point, and a characteristic line that is indicated as "Max-PCV" shows a characteristic example in which the rail pressure goes up to its highest point, respectively.

Further, a characteristic line that is indicated as "PCV-CUR" shows a characteristic example that is positioned almost in the middle of a range of the variation of the characteristics of the pressure control valve 12.

On the other hand, with respect to the pressure control valve, a correlation between individual rail pressure and the energization current is stored in advance in the electronic control unit 4, and the correlation represents characteristics of a so-called median product. More specifically, while the correlation between the rail pressure and the energization current of the pressure control valve varies in many different ways, the correlation that is positioned almost in the middle in the range of the variation, in other words, the standard correlation between the rail pressure and the energization current (refer to the characteristic line that is indicated as "PCV-CUR" in FIG. 3), is stored in advance.

Further, in the fuel injection control processing performed by the electronic control unit 4, a required rail pressure (target rail pressure) is calculated based on the engine rotational speed, the accelerator pedal position, the rail pressure etc. In the embodiment of the invention, as generally described above, one of the three control states is selected before rail pressure control is performed, and there is the above-described second rail pressure control state as a control mode in which the rail pressure control is performed through changing the valve opening degree of the pressure control valve 12.

Under the second rail pressure control state, when the target rail pressure is set as described above, energization corresponding to the target rail pressure is applied to the pressure control valve 12. Then, at this time, when the electrical characteristics of the pressure control valve 12 match the characteristics of the median product that are stored in advance in the electronic control unit 4, or when they are within an acceptable range of variation, it suffices if the amount of energization, which is determined based on the stored correlation between the target rail pressure and the energization current, is performed.

However, in practice, it is inevitable that the electrical characteristics of the pressure control valve 12 have some level of variation in relation to the characteristics of the median product. Therefore, in consideration of the actual variation of the electrical characteristics of the pressure control valve 12, a correction using a correction coefficient Cv as described below is performed with respect to the energization amount (energization current value) Is of the pressure control valve 12, which is determined based on stored data in the electronic control unit 4 in relation to the target rail pressure. Then, the pressure control valve 12 starts being energized at a current value which is determined after the correction, and its energization drive is feedback controlled to obtain a desired rail pressure.

Here, given a target rail pressure, when Iact is defined as the actual energization amount (energization current value) of the pressure control valve 12 that is finally determined as a result of the feedback control, the correction coefficient Cv is calculated by dividing the energization amount Iact by the above-described Is. In other words, the correction coefficient $Cv=Iact \div Is$.

Every time the correction coefficient Cv is calculated as described above, the so-called learning processing is performed, in which the correction coefficient Cv is repeatedly stored in the predetermined memory area in the electronic control unit 4 along with the actual rail pressure.

Then, in the embodiment of the invention, when the target rail pressure is determined, the energization current value Is for the target rail pressure is calculated based on the characteristics of the median product of the pressure control valves 12 that are stored in advance in the electronic control unit 4, and at the same time, the learning value of the above-described correction coefficient Cv for the target rail pressure is retrieved from the predetermined memory area in the electronic control unit 4. Next, the energization current value Is is corrected using the correction coefficient Cv. More specifically, $Is \times Cv$ is calculated, and the energization drive is performed, while using the multiplication result as the energization current value that should be supplied to the pressure control valve 12 in practice.

Based on such an assumption, when the pressure sensor failure diagnosis processing is started by the electronic control unit 4, at first, the above-described learning processing relating to the pressure control valve 12 is performed, and it is determined whether or not an acquisition count n of the learning value exceeds a predetermined count K (refer to step S100 in FIG. 2).

Note that, here, more specifically, the learning value is a pair of the above-mentioned correction coefficient Cv and the actual rail pressure that corresponds to the correction coefficient Cv.

Determination processing at step 100 is repeatedly performed until it is determined that the acquisition count of the learning value exceeds the predetermined count K, and when it is determined that the acquisition count of the learning value exceeds the predetermined count K (when YES), the process advances to step S102 which is described below.

Here, the reason why the acquisition count n of the learning value is set to exceed the predetermined count K is because through repeating the learning processing a number of times, the possibility is reduced that the correction coefficient Cv may deviate too far, and thus more reliable failure diagnosis can be performed.

Next, at step S102, every time a new learning value is acquired in the above-described learning processing related to the pressure control valve 12, which is performed as a separate process, the learning value is captured (refer to step S102 in FIG. 2), and it is determined whether or not a captured learning value X is within a predetermined range, in other words, whether or not the value satisfies $\alpha<x<\beta$ (refer to step S104 in FIG. 2).

Here, a predetermined lower limit $\alpha$ and a predetermined upper limit $\beta$ are set with reference to a variation range of the learning value of the above-described correction coefficient Cv. The variation of the learning value is caused by a variation of output characteristics of the pressure sensor 11.

More specifically, first, variation data of the output characteristics of the pressure sensor 11 are obtained in advance through a simulation, a test etc. Next, a variation range of the learning value of the correction coefficient Cv is obtained through a simulation, a test etc. in a case in which the detection signal of the pressure sensor 11 varies within the range of the variation data obtained Then, for example, when the learning value of the correction coefficient Cv varies because of the variation of the characteristics of the pressure sensor 11, the variation being obtained as described above, if a lower limit $\alpha$ and an upper limit $\beta$ are respectively identified through a simulation etc., the lower limit a should be at least equal to $\alpha$, or it should be set to $\alpha 1$, which is a smaller value than $\alpha$ ($\alpha 1<\alpha$). On the other hand, the upper limit $\beta$ should be at least equal to $\beta$, or it should be set to $\beta 1$, which is a larger value than $\beta$ ($\beta 1>\beta$).

Then, at step S104, when it is determined that $\alpha<x<\beta$ is satisfied (when YES), it is determined that the pressure sensor 11 is normal, and the sequence of processes is completed. Then, the process returns to a main routine, which is not shown in the figures, and the sequence of processes shown in FIG. 2 is performed again, after other necessary processes are completed.

On the other hand, when it is determined that $\alpha<x<\beta$ is not satisfied (when NO), it is determined that the pressure sensor 11 has a failure, and an error determination is made. Then, a necessary warning display and sound are made, and the sequence of processes comes to an end (refer to step S106 in FIG. 2). Note that, at step S106 in FIG. 2, "RDS" represents the pressure sensor 11.

Next, the significance of performing the above-described failure diagnosis of the pressure sensor 11 is described below with reference to FIG. 4.

First, one example of a pressure sensor failure diagnosis method that was known before the pressure sensor failure diagnosis processing according to the embodiment of the invention invented by the inventor of the invention will be explained. For example, a method in which the correction coefficient Cv, which is used for the above-described energization drive of the pressure control valve 12, is used as a standard for determining whether or not the pressure sensor 11 has a failure, has actually been used in an apparatus developed by the applicant of the invention.

More specifically, when the correction coefficient Cv is within the predetermined range, in other words, when a1<Cv<b1 is satisfied, it is determined that the pressure sensor 11 is normal, and on the other hand, when a1<Cv<b1 is not satisfied, it is determined that the pressure sensor 11 has a failure.

This failure diagnosis method takes particular note of the fact that, when the pressure sensor 11 has any failure, the correction coefficient Cv shows an abnormal value compared with values at normal times.

In the case of this failure diagnosis method, the standard values a1 and b1, which determine that the pressure sensor 11 has a failure, should be set while taking into account the variation of the characteristics of the pressure sensor 11 and the pressure control valve 12, and factors other than those relating to the pressure sensor 11 and the pressure control valve 12, as other factors may cause the variation of the learning value of the pressure control valve 12.

Figure 4:
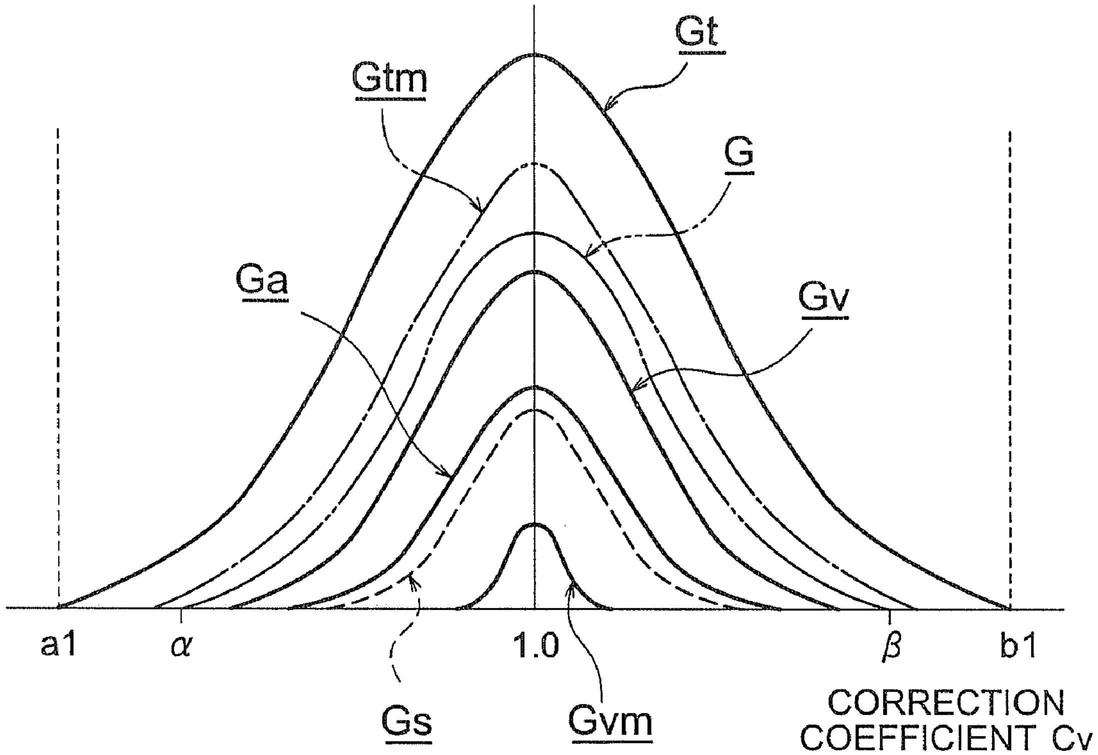
FIG. 4 is a schematic diagram that schematically shows an example of a variation caused by various factors relating to a correction coefficient Cv in rail pressure control.

With respect to a plurality of representative factors that influence the correction coefficient Cv, FIG. 4 shows a schematic diagram that schematically shows an example of a change distribution of the correction coefficient Cv, when the change is caused by variations of respective factors. FIG. 4 will be described below. First, in FIG. 4, a characteristic line indicated by the reference numeral Gv schematically shows an example of the variation of the correction coefficient Cv that is caused by the variation of the electrical characteristics of the pressure control valve 12. In this example, the variation of the correction coefficient Cv that is caused by the variation of the electrical characteristics of the pressure control valve 12 results in a distribution more or less similar to a normal distribution. Here, correction coefficient Cv=1.0 is a point that matches the above-described characteristics of the median product.

Additionally, the pressure sensor 11 can be included as one of the representative factors that influence the correction coefficient Cv. In FIG. 4, a characteristic line indicated by the reference numeral Gs schematically shows the variation of the correction coefficient Cv that is caused by the variation of the electrical characteristics of the pressure sensor 11.

Further, in FIG. 4, a characteristic line indicated by the reference numeral Ga schematically shows the variation of the correction coefficient Cv that is caused by factors which influence the correction coefficient Cv, other than the pressure control valve 12 and the pressure sensor 11.

In this way, since the variation of the above-described plurality of factors influence the correction coefficient Cv, the value of the correction coefficient Cv fluctuates while reflecting all the variations of the above-described plurality of factors. The correction coefficient Cv fluctuates in the manner shown by a characteristic line indicated by the reference numeral Gt in FIG. 4. Here, based on what is described above, Gt is expressed as Gt=Gv+Gs+Ga.

Therefore, in the case of determining whether or not the pressure sensor 11 has a failure using the correction coefficient Cv, determination standard values need to be set outside the variation range of the correction coefficient Cv. More specifically, in the example shown in FIG. 4, a lower limit side needs to be set to a value which is equal to or less than a1, and an upper limit side needs to be set to a value which is equal to or greater than b1.

However, when the correction coefficient Cv, which includes many variation factors and fluctuates as described above, is used to determine whether or not the pressure sensor 11 has a failure, for example, when the electrical characteristics of the pressure control valve 12 are similar to those of the median product, the correction coefficient Cv comes to be equal to or less than the above-described determination standard value a1 or comes to be equal to or greater than the above-described determination standard value b1, only after the electrical characteristics of the pressure sensor 11 worsen significantly. Therefore, a drawback of this method is that it lacks swiftness in finding a failure.

In contrast, the failure diagnosis processing according to the embodiment of the invention uses, as its determination standard for the failure diagnosis, the variation of the learning value of the correction coefficient Cv, which mainly takes into account the variation of the pressure sensor 11. Namely, and more specifically, the variation range of the correction coefficient Cv that is determined by the variation of the correction coefficient Cv caused by the variation of the electrical characteristics of the pressure sensor 11 (refer to the characteristic line indicated by the reference numeral Gs in FIG. 4) and by the variation of the correction coefficient Cv caused by the factors other than the pressure control valve 12 and the pressure sensor 11 (refer to the characteristic line indicated by the reference numeral Ga in FIG. 4), namely, the variation range of the correction coefficient Cv that is illustrated by the characteristic line indicated by the reference numeral G in FIG. 4, is used as the determination standard for the failure diagnosis. Here, it is expressed as G=Gs+Ga.

Therefore, compared with the variation of the correction coefficient Cv that includes the variation of a plurality of conceivable factors (refer to the characteristic line indicated by the reference numeral Gt in FIG. 4), the variation of the correction coefficient Cv that mainly takes into account the variation of the above-described electrical characteristics of the pressure sensor 11 (refer to the characteristic line indicated by the reference numeral G in FIG. 4) is sufficiently smaller, which makes it possible to perform the failure diagnosis of the pressure sensor 11 swiftly.

Note that, with respect to the target rail pressure, the embodiment of the invention is adapted to correct the energization current value Is by multiplying the energization current value Is by the correction coefficient Cv, Is being determined based on the characteristics of the median product of the pressure control valves 12 that are stored in the electronic control unit 4. However, since a correction mode is not necessarily limited to the multiplication of the correction coefficient Cv, division, addition, subtraction etc. can be selected as appropriate. Further, similarly, the way in which the correction coefficient Cv is set is not necessarily limited to the above-mentioned form.

Next, an initial characteristic correction of the pressure sensor 11 is described below with reference to FIG. 5 and FIG. 6.

First, in the common rail type fuel injection control apparatus, the pressure sensor 11 is an important element in realizing appropriate rail pressure control, but, in practice, its output characteristics vary depending on individual sensors.

On the other hand, in the electronic control unit 4, output characteristics of a pressure sensor (median product) having standard characteristics are stored in advance in the predetermined memory area. As a concrete example, for example, as shown in FIG. 6(*a*), a correlation between an output voltage and a rail pressure of the pressure sensor, both of which are input into the electronic control unit 4, is stored in the form of a map or an arithmetic expression.

In the electronic control unit 4, the rail pressure at a given point of time is calculated from the output voltage of the pressure sensor 11, which is input into the electronic control unit 4, with reference to the correlation stored in advance as described above, and this rail pressure is used as the actual pressure in the feedback control that is performed to cause the rail pressure to match the target rail pressure.

When the output characteristics of the pressure sensor 11 are substantially the same as the characteristics of the median product that are stored in the electronic control unit 4, or when they are within an acceptable range, no problem arises. However, when the output characteristics of the pressure sensor 11 deviate beyond the acceptable range, even if the rail pressure is determined as the target rail pressure in terms of control in the electronic control unit 4, it is different from the actual pressure. As a result, various problems arise, such as, for example, appropriate fuel injection not being achieved as desired.

It is therefore preferable to correct the output characteristics of the median product of the pressure sensors that are stored in the electronic control unit 4, based on the actual output characteristics of the pressure sensor 11.

The specific procedure is described below.

First, as a general description, with respect to the correction of the output characteristics of the pressure sensor according to the embodiment of the invention, the characteristics of the median product of the pressure sensors, which are stored in the electronic control unit 4, are corrected (pressure sensor initial performance correction) in a manufacturing process of the common rail type fuel injection control apparatus, based on the output characteristics of the pressure sensor 11 that is actually mounted. Thereafter, a correlation between the corrected rail pressure and the corrected output voltage of the pressure sensor is used for the rail pressure control.

As described below more specifically, first, actual output characteristics of an individual pressure sensor 11, in other words, the correlation of the output voltage with the rail pressure, is measured. In this case, it is preferable to obtain as much measurement data as possible, in other words, to measure the relationship of the output voltage with a plurality of the rail pressures.

Next, a deviation between measured specific output characteristics of the pressure sensor 11 and the output characteristics of the median product that are stored in the electronic control unit 4 is calculated and then coded.

Figure 5:
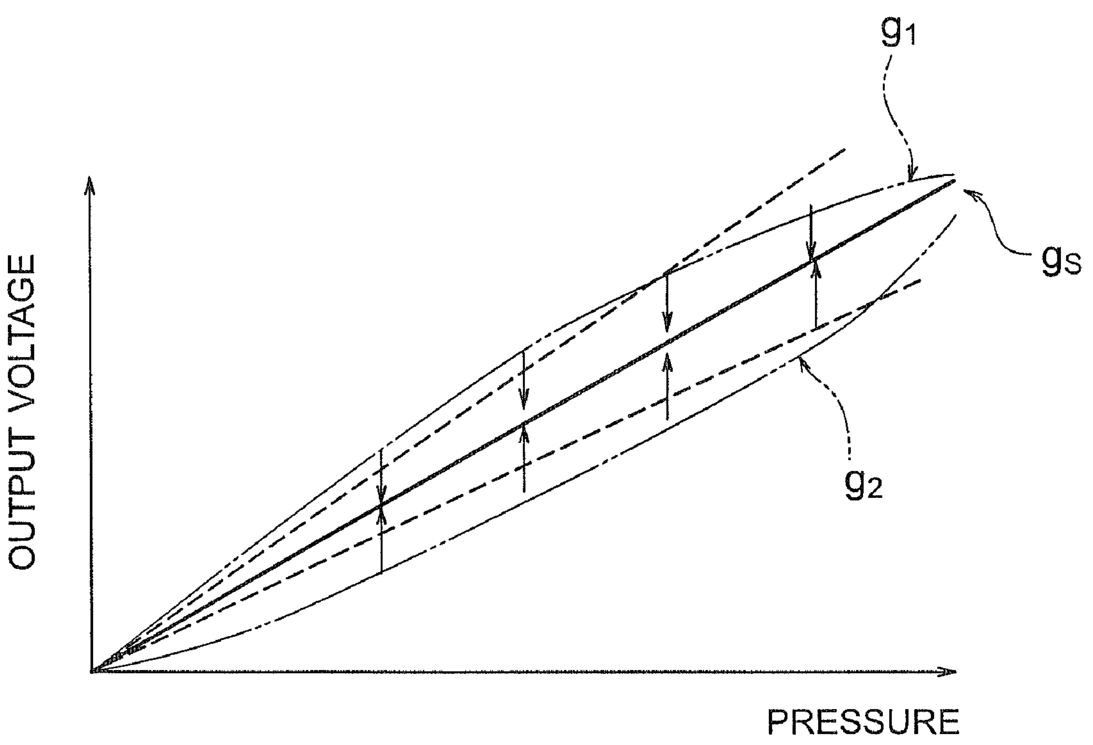
FIG. 5 is a characteristic line diagram showing an example of output characteristics of a median product of pressure sensors used for the common rail type fuel injection control apparatus shown in FIG. 1 and output characteristics of a pressure sensor which is actually used.

For example, it is assumed that the output characteristics of the median product of the pressure sensors are illustrated by a solid characteristic line indicated by the reference numeral gs in FIG. 5. Further, it is assumed that the output characteristics of the pressure sensor 11 are illustrated by a characteristic line indicated by alternating long and two short dashes and the reference numeral g1 in FIG. 5. In this case, compared with the output characteristics of the median product, given the same rail pressure, except for a small segment, the output characteristics of the pressure sensor 11 has the characteristic that a voltage is output that is higher than that of the median product.

Next, a deviation of the output voltage of the pressure sensor 11 at each individual rail pressure that is measured from the output voltage of the median product is calculated, and the deviation is coded based on a code scheme selected in advance. Note that, hereinafter, an individual deviation amount that is coded is referred to as a “correction code” for convenience.

In FIG. 6(*b*), it is assumed that the pressure sensor 11 has the output characteristics indicated by the reference numeral g1 in FIG. 5 as an example, and further, in a case in which the output characteristics of the median product are as shown in FIG. 6(*a*), an example of correspondence relationships between the deviation amount that exists between the pressure sensor 11 and the median product and the correction code is shown.

First, in the embodiment of the invention, given the same rail pressure, the deviation amount is a deviation of the output voltage of the median product from the actual output voltage of the pressure sensor 11.

For example, in FIG. 6(*b*), with the correction code z, the deviation amount is shown as −0.1(V) at a rail pressure of 200

(MPa). This means that when the rail pressure is 200 (MPa), the output voltage of the median product is lower than the actual output voltage of the pressure sensor 11 by 0.1 (V), in other words, the output voltage of the pressure sensor 11 is higher by 0.1 (V), and more specifically, this means that the output voltage of the pressure sensor 11 is 4.4 (V).

Other correction codes and deviation amounts can be also interpreted in a similar way.

In this way, the correction code is a predetermined code that includes in converted form information about the deviation amount and which rail pressure the deviation amount corresponds to. The correction code is not necessarily limited to a specific form, but something like a bar code, for example, is preferable.

When a bar code is used, a reading device that reads the bar code and inputs it into the electronic control unit 4 is necessary. However, for this, any device with a known structure can be used, and thus a detailed explanation of this is omitted here.

After the correction code related to the deviation amount is obtained as described above, the correction code is input into the electronic control unit 4.

Input of the correction code is performed using an input device corresponding to a type of the correction code used. For example, when the bar code is used as the correction code as described above, the correction code is input into the electronic control unit 4 by a bar code reader (not shown in the figures). Note that, as other input means, a character input device, such as a so-called keyboard and a character input tablet, may be used.

Then, in the embodiment of the invention, when the correction code is input into the electronic control unit 4, decoding (decode) processing of the correction code stored in the electronic control unit 4 is started, and the deviation amount corresponding to the correction code and the rail pressure that generates the deviation amount are decoded. Note that the decoding processing of the correction code varies depending on the code scheme used for coding, and as the decoding processing itself may be any known processing and it is not limited to specific processing, a concrete explanation is omitted here.

Then, based on a decoding result, the output voltage of the output characteristics of the median product that are stored in the electronic control unit 4 is corrected, and then the output characteristics are rewritten.

Namely, in FIG. 6(*b*), for example, taking the correction code z as an example, the correction code z means that when the rail pressure is 200 (MPa), the output voltage of the median product is lower than the output voltage of the pressure sensor 11 by 0.1 V. Therefore, the output voltage of the median product at the rail pressure of 200 (MPa), which is 4.3 (V), is rewritten as 4.4 (V). In other words, a value obtained by inverting a sign of a numerical value of the deviation amount is added to the output voltage of the median product.

The decoding is also performed for other correction codes in a similar way, and based on the decoding result, the output characteristics of the median product are rewritten. As a result, the output characteristics of the median product shown in FIG. 6(*a*) become as shown in FIG. 6(*c*).

In this way, through rewriting the output characteristics of the median product of the pressure sensors that are stored in the electronic control unit 4 based on the actual characteristics of the pressure sensor 11, a more accurate rail pressure detected by the pressure sensor 11 is used for the rail pressure control.

Further, through performing the initial characteristic correction of the pressure sensor 11 in this way, at the time of the pressure sensor failure diagnosis processing illustrated in FIG. 2 above, it is possible to make a value of the predetermined count K smaller, the predetermined count K being the standard value for determining whether or not the acquisition count of the learning value is sufficient, thus making the processing time of the failure diagnosis shorter.

Note that, in the above-described example, a case is described in which the output voltage in the output characteristics of the pressure sensor 11 becomes higher than the output characteristics of the median product (refer to the characteristic line indicated by alternating long and two short dashes and the reference numeral g1 in FIG. 5). However, even when the output voltage of the pressure sensor 11 becomes lower than the output characteristics of the median product, for example, as indicated by a characteristic line with alternating long and two short dashes and the reference numeral g2 in FIG. 5, it is basically possible to rewrite the output characteristics of the median product using a similar procedure to that described above.

Note that, for example, when the output characteristics of the pressure sensor 11 change in a linear manner as indicated by dashed lines in FIG. 5, a resistor may be provided between the pressure sensor 11 and the electronic control unit 4 to artificially match the voltage input into the electronic control unit 4 to that of the median product. As a result of this, an effect or an advantage similar to rewriting the output characteristics of the median product by software processing in the electronic control unit 4 as described above is achieved.

The above-described initial performance correction of the pressure sensor 11 can be applied to the pressure control valve 12 in a similar manner.

A general outline of an initial performance correction of the pressure control valve 12 will be described below with reference again to FIG. 3 and FIG. 6.

First, actual energization characteristics of an individual pressure control valve 12, namely, the correlation of the energization current with the rail pressure is measured (refer to FIG. 3). In this case, it is preferable to measure the relationship of the energization current with as many rail pressures as possible.

Next, a deviation amount between the energization current of the pressure control valve 12 for a plurality of the measured rail pressures and the energization current of the median product of the pressure control valves for the same rail pressures is calculated and coded. The energization current of the median product is stored in the electronic control unit 4.

In this case, in a similar manner to the above-described initial performance correction of the pressure sensor, the "deviation amount" is the deviation amount of the energization current of the median product from the energization current of the pressure control valve 12.

Through the coding, the correction code for the individual deviation amount is obtained in a similar manner to that of the initial performance correction of the pressure sensor (refer to FIG. 6(*b*)). Note that, since a specific code scheme used for the coding and information included in the correction code is the same as that described above in the example of the pressure sensor, another detailed description is omitted here.

Then, through inputting the correction code into the electronic control unit 4, the decoding processing is performed on the correction code, and based on the decoding result, the energization characteristics of the median product of the pressure control valves are rewritten.

Here, the impact on the above-described pressure sensor failure diagnosis caused by rewriting the energization characteristics of the median product of the pressure control valves based on the actual energization characteristics of the pressure control valve 12, as described above, is explained with reference to FIG. 4. The energization characteristics of the median product are stored in advance in the electronic control unit 4.

First, if the initial performance correction of the pressure control valve 12 is not performed, as described above, the variation of the correction coefficient Cv caused by the variation of the energization characteristics of the pressure control valve 12 becomes similar to the characteristic line indicated by the reference numeral Gv illustrated in FIG. 4 as an example.

On the other hand, when the initial performance correction of the pressure control valve 12 is performed, the impact of the energization characteristics of the pressure control valve 12 on the variation of the correction coefficient Cv is limited to the variation of the measurement result of the energization characteristics. Therefore, the variation becomes sufficiently smaller as shown by a characteristic line indicated by the reference numeral Gvm in FIG. 4 as an example, compared with the characteristic line indicated by the reference numeral Gv.

As a result, an overall variation of the correction coefficient Cv becomes similar to a characteristic line indicated by the reference numeral Gtm in FIG. 4, and it becomes sufficiently smaller compared with the characteristic line indicated by the reference numeral Gt that illustrates the variation of the correction coefficient Cv in a case in which the initial performance correction of the pressure control valve 12 is not performed.

Further, by performing the initial characteristic correction of the pressure control valve 12 as described above, at the time of the pressure sensor failure diagnosis processing illustrated in FIG. 2 above, it is possible to make the value of the predetermined count K smaller, the predetermined count K being the standard value for determining whether or not the acquisition count of the learning value is sufficient, and thus make the processing time of the failure diagnosis shorter.

The invention can use the learning value of the learning processing in existing fuel injection control for the failure diagnosis of the pressure sensor, and thus makes a dedicated circuit for the failure diagnosis unnecessary. Therefore, the invention can be particularly well applied to a common rail type fuel injection control apparatus that requires a pressure sensor failure diagnosis function with a simple structure.

According to the invention, a learning value in existing learning processing for drive control of a pressure control valve is used for determining whether or not there is any failure of a pressure sensor, the drive control being performed as part of a fuel injection control. Further, according to the invention, it is determined whether or not there is any failure using a range of variation of the learning value, the variation being caused by variation in the pressure sensor. Therefore, as advantages, the invention makes it possible to realize a failure diagnosis of the pressure sensor with a simple structure without installing a dedicated circuit for the failure diagnosis, and it can provide a highly reliable common rail type fuel injection control apparatus.

What is claimed is:

1. A pressure sensor failure diagnosis method in a common rail type fuel injection control apparatus, wherein a pressure control valve is provided on a fuel return path from a common rail, and a rail pressure detected by a pressure sensor can be controlled to match a target rail pressure that is calculated based on operational information of an engine, through drive control of the pressure control valve, wherein the pressure control valve is driven by energization at a current value that is obtained by correcting, using a predetermined correction coefficient, a current value that is determined in accordance with the target rail pressure, based on predetermined drive characteristics of the pressure control valve that are stored in advance, and wherein the predetermined correction coefficient is calculated for the target rail pressure, using a predetermined arithmetic expression, based on the current value determined in accordance with the predetermined drive characteristics of the pressure control valve and a current value by which the pressure control valve is energized to cause a rail pressure detected by the pressure sensor to match the target rail pressure or to fall within a predetermined acceptable range, while the correction coefficient is stored and updated through learning processing every time the correction coefficient is calculated, along with the rail pressure at the time of the calculation, the pressure sensor failure diagnosis method being characterized by diagnosing that the pressure sensor has a failure when a learning value of the correction coefficient in the learning processing deviates from a predetermined range.

2. The pressure sensor failure diagnosis method according to claim 1, characterized in that the predetermined range is determined by referring to a variation in output characteristics of the pressure sensor as a standard.

3. A common rail type fuel injection control apparatus that comprises a high pressure pump device that pressure feeds fuel to a common rail, a pressure control valve that is provided on a return path of fuel from the common rail, a pressure sensor that detects pressure of the common rail, and an electronic control unit that controls drive of the high pressure pump device and the pressure control valve, wherein the electronic control unit calculates a target rail pressure based on operational information of an engine, and in order to match a rail pressure detected by the pressure sensor with the target rail pressure, the electronic control unit drives the pressure control valve by energization at a current value that is obtained by correcting, using a predetermined correction coefficient, a current value that is determined in accordance with the target rail pressure, based on predetermined drive characteristics of the pressure control valve that are stored in advance, and wherein the predetermined correction coefficient is calculated for the target rail pressure, using a predetermined arithmetic expression, based on the current value determined in accordance with the predetermined drive characteristics of the pressure control valve and a current value by which the pressure control valve is energized to cause a rail pressure detected by the pressure sensor to match the target rail pressure or to fall within a predetermined acceptable range, while the correction coefficient is stored and updated through learning processing every time the correction coefficient is calculated, along with the rail pressure at the time of the calculation, the common rail type fuel injection control apparatus being characterized in that the electronic control unit determines whether a learning value of the correction coefficient in the learning processing is within a predetermined range, and diagnoses the pressure sensor as having a failure when it is determined that the learning value is out of the predetermined range.

4. The common rail type fuel injection control apparatus according to claim 3, characterized in that the predetermined range is determined by referring to a variation in output characteristics of the pressure sensor as a standard.

5. The common rail type fuel injection control apparatus according to claim 4, characterized in that the electronic control unit stores predetermined output characteristics of the pressure sensor in advance, and when actually measured output characteristics of the pressure sensor, which is connected to the electronic control unit, are input, the predetermined output characteristics of the pressure sensor are corrected based on the actually measured output characteristics.

6. The common rail type fuel injection control apparatus according to claim 4, characterized in that the electronic control unit stores predetermined energization characteristics of the pressure control valve in advance, and when actually measured energization characteristics of the pressure control valve, which is driven by the electronic control unit, are input, the predetermined energization characteristics of the pressure control valve are corrected based on the actually measured energization characteristics.

7. The common rail type fuel injection control apparatus according to claim 5, characterized in that the electronic control unit stores predetermined energization characteristics of the pressure control valve in advance, and when actually measured energization characteristics of the pressure control valve, which is driven by the electronic control unit, are input, the predetermined energization characteristics of the pressure control valve are corrected based on the actually measured energization characteristics.

* * * * *